US008305986B2

(12) United States Patent  (10) Patent No.: US 8,305,986 B2
Zhang et al.  (45) Date of Patent: Nov. 6, 2012

(54) METHOD AND APPARATUS FOR UPLINK TRANSMISSIONS AND CQI REPORTS WITH CARRIER AGGREGATION

(75) Inventors: Jianzhong Zhang, Irving, TX (US); Lingjia Liu, Plano, TX (US); Juho Lee, Suwon-si (KR); Young-Han Nam, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

(21) Appl. No.: 12/686,158

(22) Filed: Jan. 12, 2010

(65) Prior Publication Data

US 2010/0226327 A1 Sep. 9, 2010

Related U.S. Application Data

(60) Provisional application No. 61/209,581, filed on Mar. 9, 2009.

(51) Int. Cl.
*H04W 4/00* (2009.01)
(52) U.S. Cl. ........................................ 370/329; 370/341
(58) Field of Classification Search ........................ None
See application file for complete search history.

(56) References Cited

U.S. PATENT DOCUMENTS

| 7,894,395 | B2* | 2/2011 | Yi et al. | 370/329 |
| 8,036,166 | B2* | 10/2011 | Tiirola et al. | 370/329 |
| 8,072,899 | B2* | 12/2011 | Pan et al. | 370/252 |
| 2005/0086403 | A1 | 4/2005 | Tang | |
| 2009/0011769 | A1* | 1/2009 | Park et al. | 455/450 |
| 2009/0122736 | A1* | 5/2009 | Damnjanovic et al. | 370/311 |
| 2009/0168718 | A1* | 7/2009 | Wang et al. | 370/330 |
| 2009/0175220 | A1* | 7/2009 | Yi et al. | 370/328 |
| 2009/0323577 | A1* | 12/2009 | Agrawal et al. | 370/312 |
| 2010/0098012 | A1* | 4/2010 | Bala et al. | 370/329 |
| 2011/0310940 | A1* | 12/2011 | Ozluturk | 375/219 |

FOREIGN PATENT DOCUMENTS

| KR | 1020080013989 A | 2/2008 |
| KR | 1020080041545 A | 5/2008 |
| KR | 1020080069302 A | 7/2008 |
| WO | WO 2006/117390 A1 | 11/2006 |
| WO | WO 2008/156549 A1 | 12/2008 |

OTHER PUBLICATIONS

International Search Report dated Oct. 11, 2010 in connection with International Patent Application No. PCT/KR2010/001400.
Amin Shokrollahi, "Raptor Codes", IEEE Transactions on Information Theory, vol. 52, No. 6, Jun. 2006, p. 2551-2567.
Saejoon Kim, et al., "An Efficient Algorithm for ML Decoding of Raptor Codes over the Binary Erasure Channel", IEEE Communications Letters, vol. 12, No. 8, Aug. 2008, p. 578-580.
Michael Ludy, et al., "Raptor Codes for Reliable Download Delivery in Wireless Broadcast Systems", 2006 IEEE, p. 192-197.
P. Palanisamy, et al., "Performance Analysis of Raptor Codes in OFDM Systems", First International Conference on Emerging Trends in Engineering and Technology, 2008 IEEE, p. 1307-1312.

* cited by examiner

*Primary Examiner* — Chi Pham
*Assistant Examiner* — Soon-Dong D Hyun

(57) ABSTRACT

A mobile station capable of communicating via an uplink transmission to at least one base station in a Multiple Input Multiple Output wireless network is configured to transmit multiple channel quality index (CQI) reports corresponding to multiple downlink component carriers. The mobile station includes at least one transmit antenna and a transmitter. The transmitter can communicate with a base station over the multiple downlink component carriers and at least one uplink component carrier. The transmitter can transmit the CQI report over the at least one uplink component carrier using at least one of a number of CQI reporting modes.

42 Claims, 10 Drawing Sheets

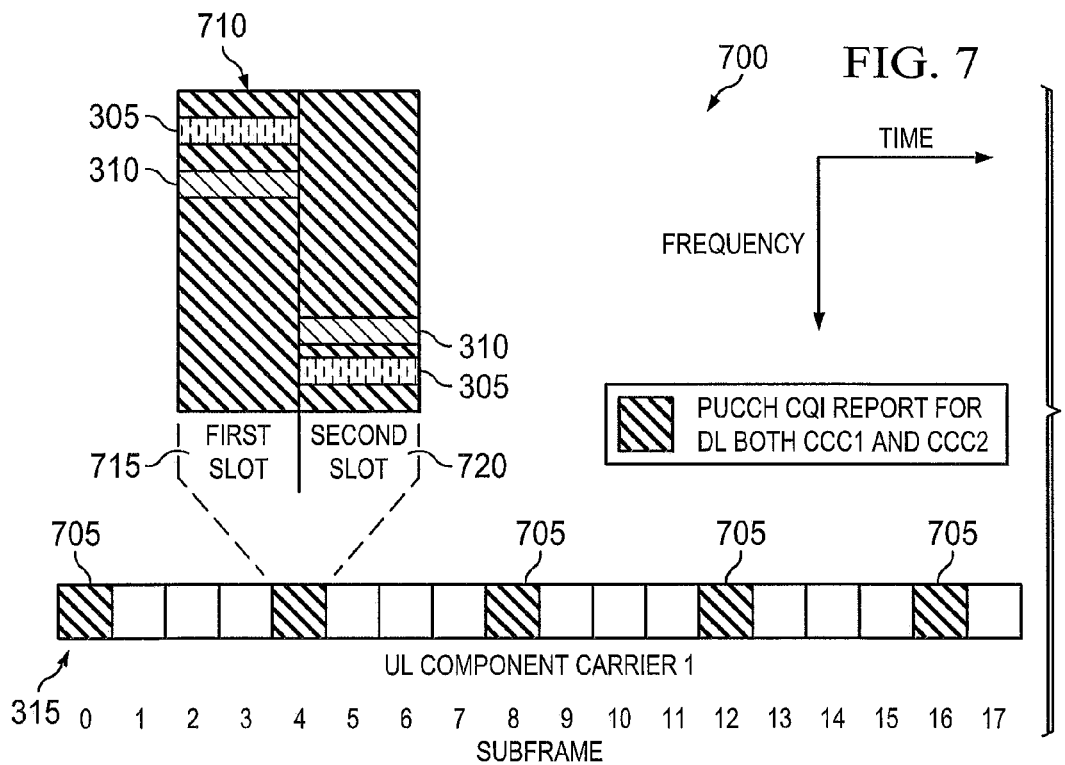
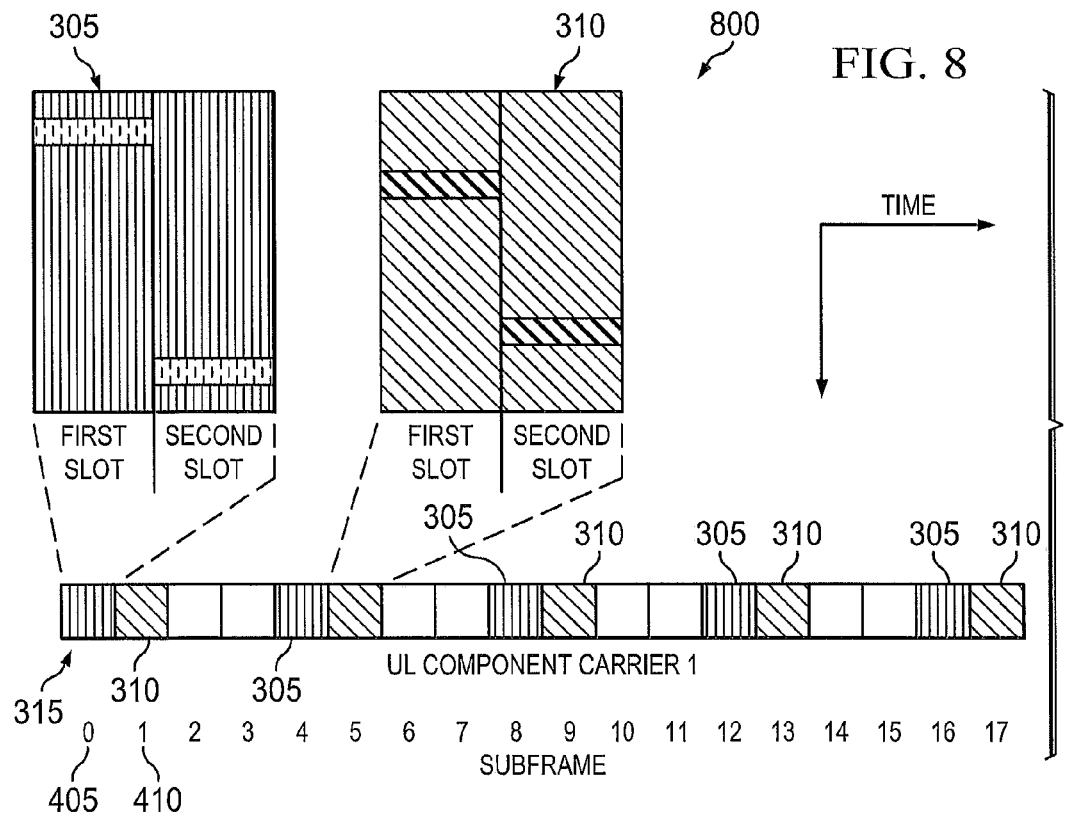

METHOD AND APPARATUS FOR UPLINK TRANSMISSIONS AND CQI REPORTS WITH CARRIER AGGREGATION

CROSS-REFERENCE TO RELATED APPLICATION(S) AND CLAIM OF PRIORITY

The present application is related to U.S. Provisional Patent Application No. 61/209,581, filed Mar. 9, 2009, entitled "UPLINK TRANSMISSIONS AND CQI REPORTS WITH CARRIER AGGREGATION". Provisional Patent Application No. 61/209,581 is assigned to the assignee of the present application and is hereby incorporated by reference into the present application as if fully set forth herein. The present application hereby claims priority under 35 U.S.C. §119(e) to U.S. Provisional Patent Application No. 61/209, 581.

TECHNICAL FIELD OF THE INVENTION

The present application relates generally to wireless communications systems and, more specifically, to a system and method for Channel Quality Indicator (CQI) indicator reports with carrier aggregation.

BACKGROUND OF THE INVENTION

Modern communications demand higher data rates and performance. Multiple input, multiple output (MIMO) antenna systems, also known as multiple-element antenna (MEA) systems, achieve greater spectral efficiency for allocated radio frequency (RF) channel bandwidths by utilizing space or antenna diversity at both the transmitter and the receiver, or in other cases, the transceiver.

In MIMO systems, each of a plurality of data streams is individually mapped and modulated before being precoded and transmitted by different physical antennas or effective antennas. The combined data streams are then received at multiple antennas of a receiver. At the receiver, each data stream is separated and extracted from the combined signal. This process is generally performed using a minimum mean squared error (MMSE) or MMSE-successive interference cancellation (SIC) algorithm.

In $3^{rd}$ Generation Partnership Project (3GPP) Long Term Evolution (LTE) systems, the base station transmits a Downlink (DL) grant to a subscriber station in a Physical Downlink Control Channel (PDCCH). Some frames later, the subscriber station transmits an Acknowledgement (ACK) or Negative Acknowledgement (NACK) to the base station.

SUMMARY OF THE INVENTION

A mobile station capable of communicating via an uplink transmission to at least one base station in a Multiple Input Multiple Output wireless network is provided. The mobile station includes at least one transmit antenna and a transmitter. The transmitter is configured to communicate with the base station via a plurality of downlink component carriers and at least one uplink component carrier. The transmitter is configured transmit at least one periodic Physical Uplink Control Channel (PUCCH) channel quality index (CQI) report for a downlink component carrier in the at least one uplink component carrier. The periods for the at least one PUCCH CQI report are the same for all uplink component carriers. Additionally, a first PUCCH CQI for a first downlink component carrier is carried over a first uplink component carrier.

A mobile station capable of communicating via an uplink transmission to at least one base station in a Multiple Input Multiple Output wireless network is provided. The mobile station includes at least one transmit antenna and a transmitter. The transmitter is configured to communicate with the base station via a plurality of downlink component carriers and at least one uplink component carrier. The transmitter is configured transmit a channel quality index (CQI) report for a corresponding downlink component carrier in the at least one uplink component carrier. A number of uplink component carriers is less than a number of downlink component carriers. In addition, the transmitter is configured to transmit the CQI report corresponding to a subset of the downlink component carriers by transmitting at least two CQI reports corresponding to the set of downlink component carriers over one uplink component carrier.

A mobile station capable of communicating via an uplink transmission to at least one base station in a Multiple Input Multiple Output wireless network is provided. The mobile station includes at least one transmit antenna and a transmitter. The transmitter is configured to communicate with the base station via a plurality of downlink component carriers and at least one uplink component carrier. The transmitter is configured transmit data and a channel quality index (CQI) report for a corresponding downlink component carrier in the at least one uplink component carrier. The transmission is either over a plurality of uplink component carriers when the transmitter includes a plurality of power amplifiers of a first uplink component carrier in a first subframe and a second uplink component carrier in a second subframe when the transmitter includes one power amplifier.

A mobile station capable of communicating via an uplink transmission to at least one base station in a Multiple Input Multiple Output wireless network is provided. The mobile station includes at least one transmit antenna, a transmitter, and a receiver. The transmitter is configured to communicate with the base station via a plurality of downlink component carriers and at least one uplink component carrier. The transmitter is configured transmit data and a channel quality index (CQI) report for a corresponding downlink component carrier in the at least one uplink component carrier. The receiver is configured to receive a transmit power control (TPC) command message jointly encoding a plurality of TPC fields, wherein each of the plurality of TPC fields is configured by a higher layer signaling to associate with at least one of the plurality of uplink component carriers.

A method for communicating via a plurality of downlink component carriers and at least one uplink component carrier to at least one base station in a Multiple Input Multiple Output wireless network is provided. The method includes transmitting at least one periodic Physical Uplink Control Channel (PUCCH) channel quality index (CQI) report for a downlink component carrier in the at least one uplink component carrier. The periods for the at least one PUCCH CQI report are the same for all uplink component carriers. In addition, a first PUCCH CQI for a first downlink component carrier is carried over a first uplink component carrier.

A method for communicating via a plurality of downlink component carriers and at least one uplink component carrier to at least one base station in a Multiple Input Multiple Output wireless network is provided. The method includes transmitting a channel quality index (CQI) report for a corresponding downlink component carrier in the at least one uplink component carrier. A number of uplink component carriers is less than a number of downlink component carriers. In addition, transmitting the CQI report corresponding to a subset of the downlink component carriers is performed by transmitting at least two CQI reports corresponding to the set of downlink component carriers over one uplink component carrier.

A method for communicating via a plurality of downlink component carriers and at least one uplink component carrier to at least one base station in a Multiple Input Multiple Output wireless network is provided. The method includes transmitting by a transmitter, data and a channel quality index (CQI) report for a corresponding downlink component carrier in the at least one uplink component carrier. When the transmitter includes a plurality of power amplifiers, the transmission is via a plurality of uplink component carriers. When the transmitter includes one power amplifier, the transmission is via a first uplink component carrier in a first subframe and a second uplink component carrier in a second subframe.

A method for communicating via a plurality of downlink component carriers and at least one uplink component carrier to at least one base station in a Multiple Input Multiple Output wireless network is provided. The method includes transmitting by a transmitter, data and a channel quality index (CQI) report for a corresponding downlink component carrier in the at least one uplink component carrier. The method also includes receiving, by a receiver, a transmit power control (TPC) command message jointly encoding a plurality of TPC fields, wherein each of the plurality of TPC fields is configured by a higher layer signaling to associate with at least one of the plurality of uplink component carriers.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates Asymmetric Carrier Aggregation (CA) CQI Reporting according to embodiments of the present disclosure;

FIG. 8 illustrates Asymmetric Carrier Aggregation (CA) offset CQI Reporting according to embodiments of the present disclosure;

DETAILED DESCRIPTION OF THE INVENTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications network.

With regard to the following description, it is noted that the 3GPP Long Term Evolution (LTE) term "node B" is another term for "base station" used below. Also, the LTE term "user equipment" or "UE" is another term for "subscriber station" (or "SS") used below.

Figure 1:
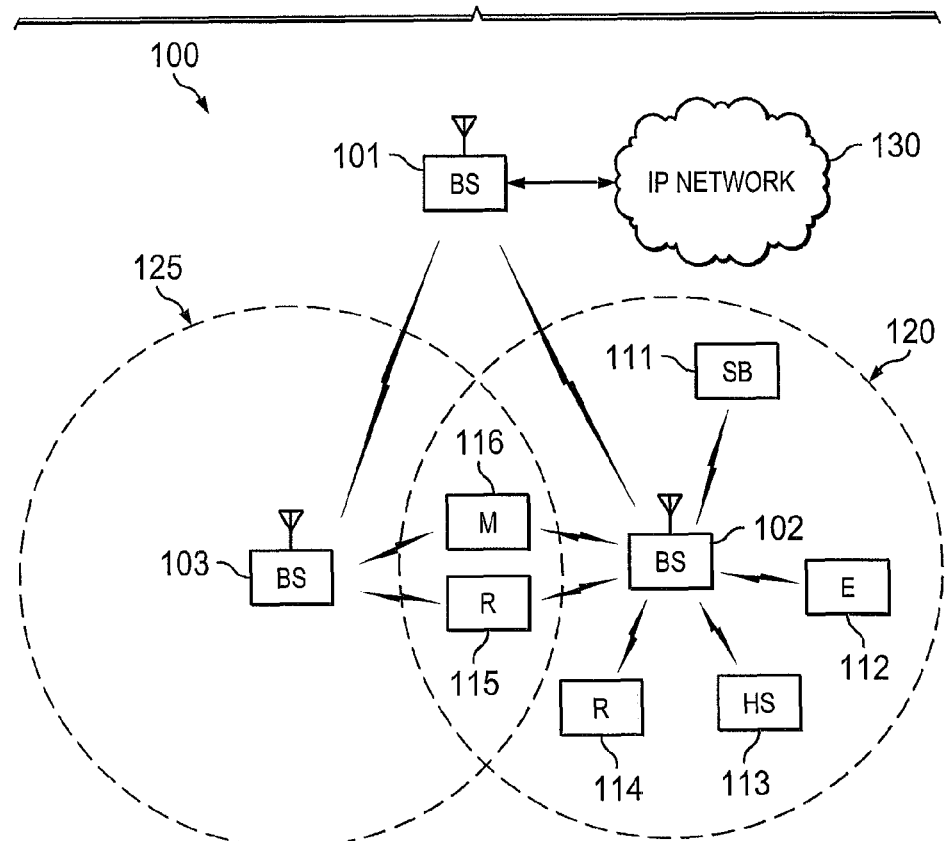
FIG. 1 illustrates an Orthogonal Frequency Division Multiple Access (OFDMA) wireless network that is capable of decoding data streams according to one embodiment of the present disclosure.

FIG. 1 illustrates exemplary wireless network 100 that is capable of decoding data streams according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. Subscriber station (SS) may be any wireless communication device, such as, but not limited to, a mobile phone, mobile PDA and any mobile station (MS). In an exemplary embodiment, SS 111 may be located in a small business (SB), SS 112 may be located in an enterprise (E), SS 113 may be located in a WiFi hotspot (HS), SS 114 may be located in a first residence, SS 115 may be located in a second residence, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116. In alternate embodiments, base stations 102 and 103 may be connected directly to the Internet by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be operating in handoff mode, as known to those of skill in the art.

In an exemplary embodiment, base stations 101-103 may communicate with each other and with subscriber stations 111-116 using an IEEE-802.16 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight or non-line-of-sight with base station 102 and base station 103, depending on the technology used for the wireless backhaul. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, café, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. In the case of voice-based communications in the form of voice-over-IP (VoIP), the traffic may be forwarded directly to the Internet gateway instead of the PSTN gateway. The servers, Internet gateway, and public switched telephone network gateway are not shown in FIG. 1. In another embodiment, the connection to network 130 may be provided by different network nodes and equipment.

In accordance with an embodiment of the present disclosure, one or more of base stations 101-103 and/or one or more of subscriber stations 111-116 comprises a receiver that is operable to decode a plurality of data streams received as a combined data stream from a plurality of transmit antennas using an MMSE-SIC algorithm. As described in more detail below, the receiver is operable to determine a decoding order for the data streams based on a decoding prediction metric for each data stream that is calculated based on a strength-related characteristic of the data stream. Thus, in general, the receiver is able to decode the strongest data stream first, followed by the next strongest data stream, and so on. As a result, the decoding performance of the receiver is improved as compared to a receiver that decodes streams in a random or pre-determined order without being as complex as a receiver that searches all possible decoding orders to find the optimum order.

Figure 2A:
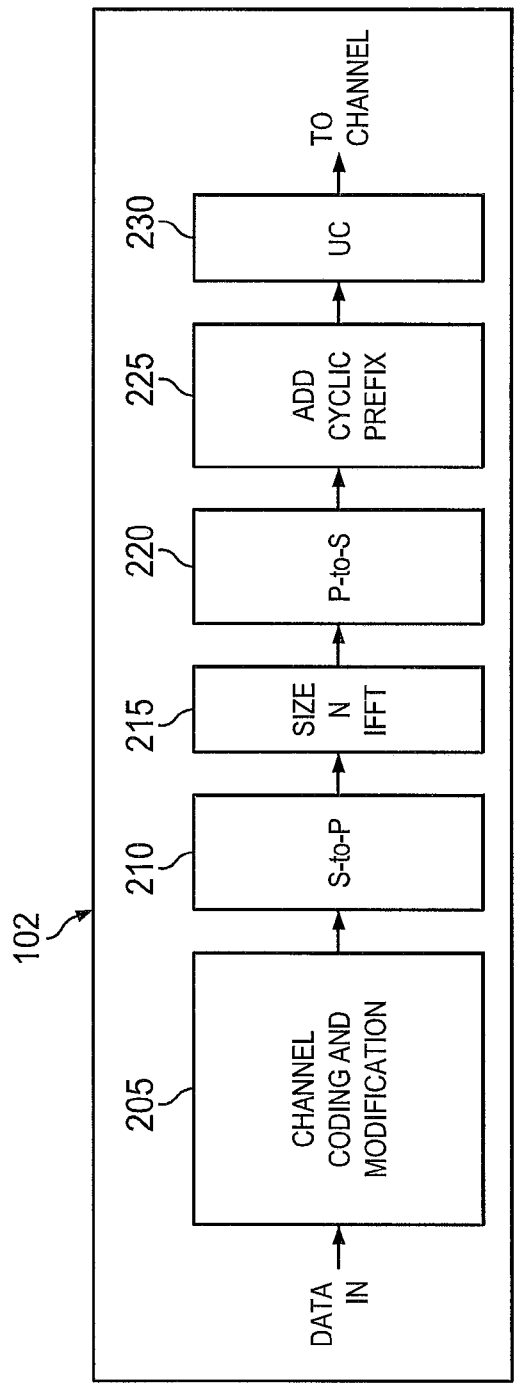
FIG. 2A is a high-level diagram of an OFDMA transmitter according to one embodiment of the present disclosure.
Figure 2B:
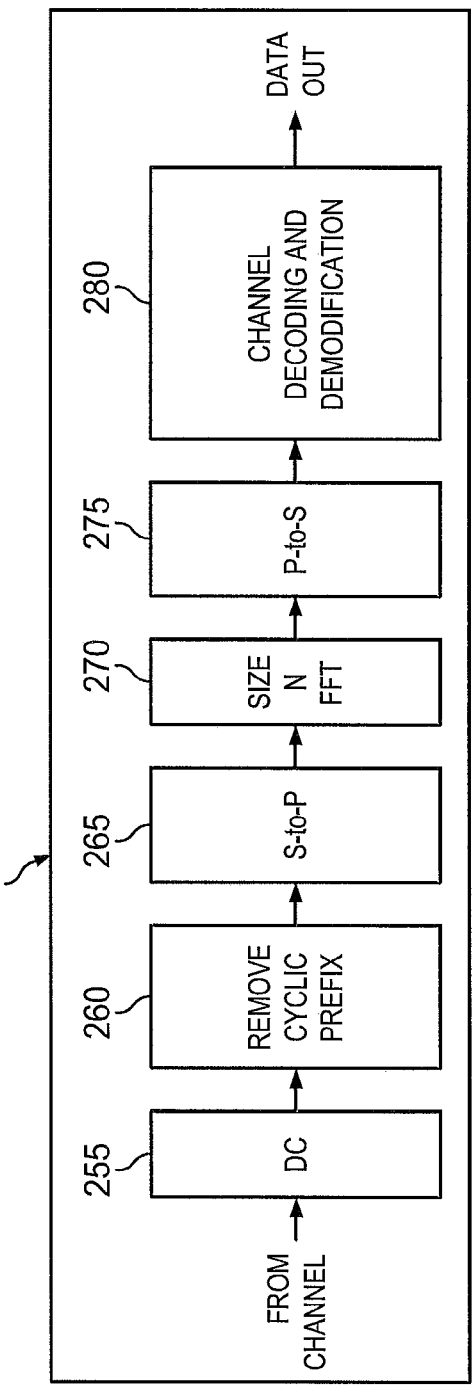
FIG. 2B is a high-level diagram of an OFDMA receiver according to one embodiment of the present disclosure.

FIG. 2A is a high-level diagram of an orthogonal frequency division multiple access (OFDMA) transmit path. FIG. 2B is a high-level diagram of an orthogonal frequency division multiple access (OFDMA) receive path. In FIGS. 2A and 2B, the OFDMA transmit path is implemented in base station (BS) 102 and the OFDMA receive path is implemented in subscriber station (SS) 116 for the purposes of illustration and explanation only. However, it will be understood by those skilled in the art that the OFDMA receive path may also be implemented in BS 102 and the OFDMA transmit path may be implemented in SS 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, and so forth), while for FFT and IFFT functions, the value of the N variable may be any integer number that is a power of two (i.e., 1, 2, 4, 8, 16, and so forth).

In BS 102, channel coding and modulation block 205 receives a set of information bits, applies coding (such as Turbo coding) and modulates (such as QPSK and QAM) the input bits to produce a sequence of frequency-domain modulation symbols. Serial-to-parallel block 210 converts (that is de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (that is multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (that is up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The present disclosure describes methods and systems to convey information relating to base station configuration to subscriber stations and, more specifically, to relaying base station antenna configuration to subscriber stations. This information can be conveyed through a plurality of methods, including placing antenna configuration into a quadrature-phase shift keying (QPSK) constellation (such as n-quadrature amplitude modulation (QAM) signal, wherein n is $2^x$) and placing antenna configuration into the error correction data (such as cyclic redundancy check (CRC) data). By encoding antenna information into either the QPSK constellation or the error correction data, the base stations 101-103 can convey base stations 101-103 antenna configuration without having to separately transmit antenna configuration. These systems and methods allow for the reduction of overhead while ensuring reliable communication between base stations 101-103 and a plurality of subscriber stations.

In some embodiments disclosed herein, data is transmitted using QAM. QAM is a modulation scheme which conveys data by modulating the amplitude of two carrier waves. These two waves are referred to as quadrature carriers, and are generally out of phase with each other by 90 degrees. QAM may be represented by a constellation that comprises $2^x$ points, where x is an integer greater than 1. In the embodiments discussed herein, the constellations discussed will be four point constellations (4-QAM). In a 4-QAM constellation a 2 dimensional graph is represented with one point in each quadrant of the 2 dimensional graph. However, it is explicitly understood that the innovations discussed herein may be used with any modulation scheme with any number of points in the constellation. It is further understood that with constellations with more than four points additional information (such as reference power signal) relating to the configuration of the base stations 101-103 may be conveyed consistent with the disclosed systems and methods.

It is understood that the transmitter within base stations 101-103 performs a plurality of functions prior to actually transmitting data. In the 4-QAM embodiment, QAM modulated symbols are serial-to-parallel converted and input to an inverse fast Fourier transform (IFFT). At the output of the IFFT, N time-domain samples are obtained. In the disclosed embodiments, N refers to the IFFT/fast Fourier transform (FFT) size used by the OFDM system. The signal after IFFT is parallel-to-serial converted and a cyclic prefix (CP) is added to the signal sequence. The resulting sequence of samples is referred to as an OFDM symbol.

At the receiver within the subscriber station, this process is reversed, and the cyclic prefix is first removed. Then the signal is serial-to-parallel converted before being fed into the FFT. The output of the FFT is parallel-to-serial converted, and the resulting QAM modulation symbols are input to the QAM demodulator.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

In order to perform successful communication between subscriber stations, such as SS 116, and base stations, such as BS 102, SS 116 report CQI (channel quality index) related to downlink transmission. In 3GPP TS 36.213 v8.5.0, "E-UTRA, Physical Layer Procedures", December 2008, the contents of which are incorporated by reference as if set forth in full herein, the CQI reporting for DL transmission is defined to be carried either aperiodically in PUSCH or periodically in PUCCH.

SS 116 can be semi-statically configured by higher layers to periodically feed back different CQI, PMI, and RI on the PUCCH using the reporting modes given in 3GPP TS 36.213 v8.5.0, Table 7.2.2-1.

In R1-084316 "Summary of email discussion on support for wider bandwidth", Nokia, RAN1#55, Prague, Czech Republic, November 2008, the contents of which hereby are incorporated by reference in its entirety, carrier aggregation is utilized to support higher bandwidth in LTE-Advanced systems. In LTE-Advanced system, spectral bandwidth will be in general much higher than the maximum configuration of the current LTE system. Therefore, multiple component carriers with each following the current LTE numerology can be aggregated together.

A SS terminal, such as SS 116, can simultaneously receive or transmit one or multiple component carriers depending on its capabilities. For example, when SS 116 is an LTE-Advanced terminal with reception and/or transmission capabilities for carrier aggregation, SS 116 can simultaneously receive and/or transmit on multiple component carriers. Additionally, when SS 116 is an LTE Rel-8 terminal, SS 116 can receive and transmit on a single component carrier only, provided that the structure of the component carrier follows the Rel-8 specifications.

Additionally, in LTE, since there is only one UL component carrier (CCC), there is no ambiguity in terms of which power control command is related to which UL CCC. Accordingly, in 3GPP TS 36.212 v 8.5.0, "E-UTRA, Multiplexing and Channel coding", December 2008, the contents of which are incorporated by reference in its entirety, the DCI format 0 is defined for uplink scheduling assignment (SA) of PUSCH.

Figure 3:
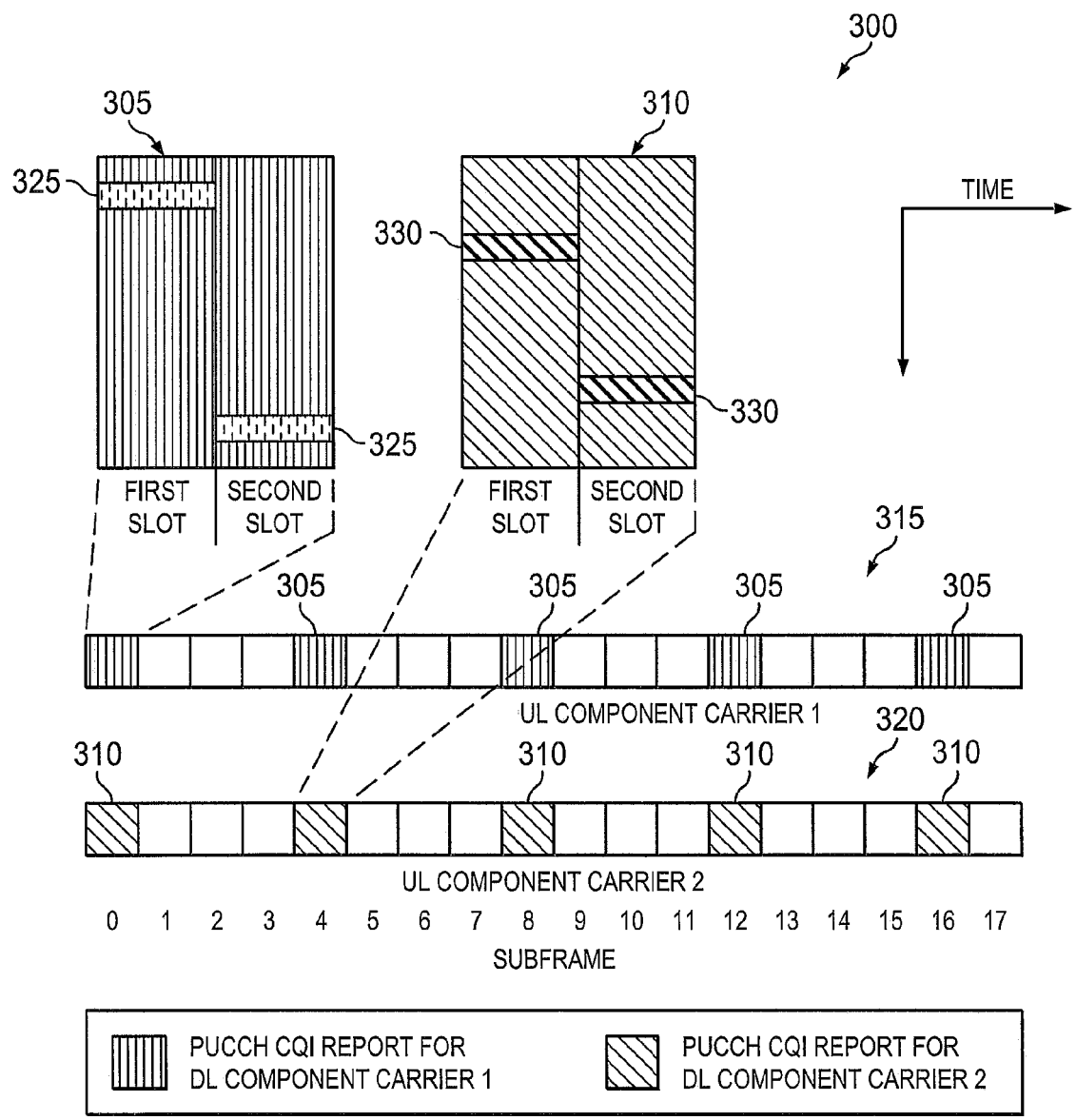
FIG. 3 illustrates Physical Uplink Control Channel CQI reporting in carrier aggregation according to embodiments of the present disclosure.

FIG. 3 illustrates Physical Uplink Control Channel CQI reporting in carrier aggregation according to embodiments of the present disclosure. The embodiment of the PUCCH CQI reporting 300 illustrated in FIG. 3 is for illustration only and other embodiments could be used without departing from the scope of this disclosure.

In some embodiments, SS 116 can pair-up the UL and DL in order to report PUCCH CQI's in each UL CCC. SS 116 can report the PUCCH CQI's such that each UL CCC reports CQI's only for its associated DL CCC. For example, SS 116 can report PUCCH CQI's 305, 310 via a first uplink component carrier (UL CCC1) 315 and a second uplink component carrier (UL CCC2) 320. The CQI report on each CCC 315, 320 is transmitted at the same periodicity (P1=P2=4) and without a timing offset between the transmissions of the two UL CCC's 315, 320. The first CQI report 305 includes CQI 325 for a first downlink component carrier (DL CCC1). The second CQI report 310 includes CQI 330 for a second downlink component carrier (DL CCC2). The PUCCH CQI report for each DL CCC can be a rank report, wideband CQI report or subband CQI report.

Figure 4:
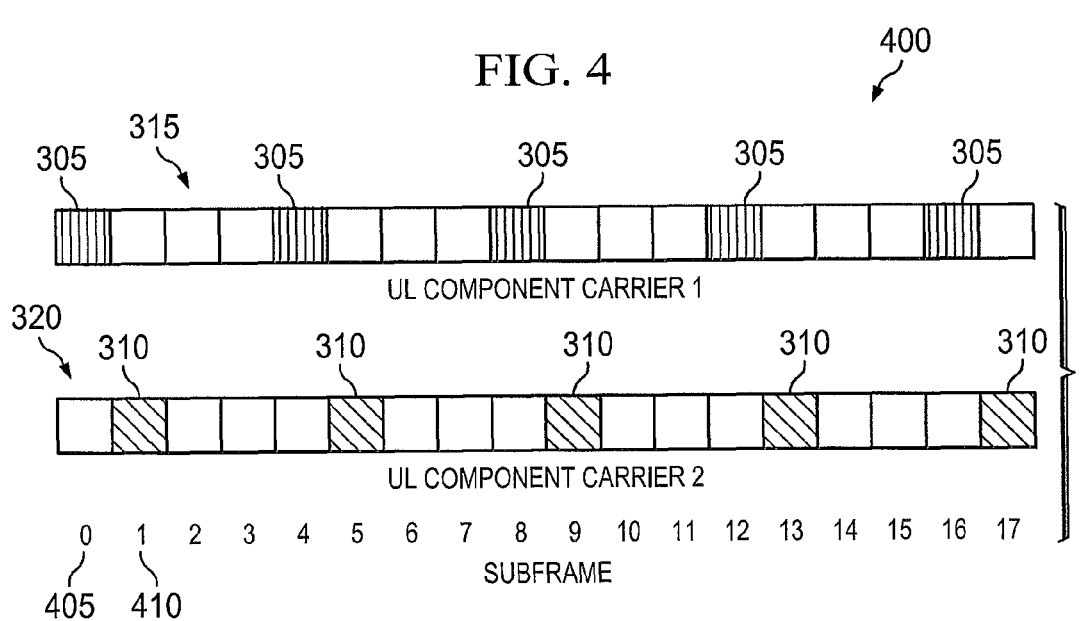
FIG. 4 illustrates Staggered CQI Reporting according to embodiments of the present disclosure.

FIG. 4 illustrates Staggered CQI Reporting according to embodiments of the present disclosure. The embodiment of the Staggered CQI reporting 400 shown in FIG. 4 is for illustration only. Other embodiments could be used without departing from the scope of this disclosure.

In some embodiments, SS 116 performs PUCCH CQI reporting using a timing offset to stagger the PUCCH CQI's 305, 310. As described herein above with respect to FIG. 3, each UL CCC 315, 320 reports PUCCH CQI for its associated DL CCC. However, SS 116 inserts a timing offset between the CQI report in UL CCC1 315 and UL CCC2 320. For example, the first PUCCH CQI 305 is transmitted in a first subframe 405 of UL CCC1 315. Additionally, the second PUCCH CQI 310 is transmitted in a second subframe 410 of UL CCC2 320. Accordingly, SS 116 staggers PUCCH CQI's 305, 315 to avoid transmitting in both UL CCCs 315, 320 at the same time. Using the Staggered (timing offset) CQI Reporting 400, SS 116 saves battery power since a lower Peak-To-Average Ration (PAPR) is achieved at SS 116. Therefore, SS 116 is able to improve coverage in the uplink.

In order to avoid transmitting multiple PUCCH CQI's 305, 310 within the same uplink subframe, the following conditions are first met:

1) If the minimum periodicity among all UL CCC reports is "P", then the periodicity of CQI reports on other CCCs is N×P, wherein "N" is a positive integer number; and 2) The timing offset (O) between CQI reports on different CCCs is less than or equal to P−1 subframes (O≦(P−1)).

Figure 5:
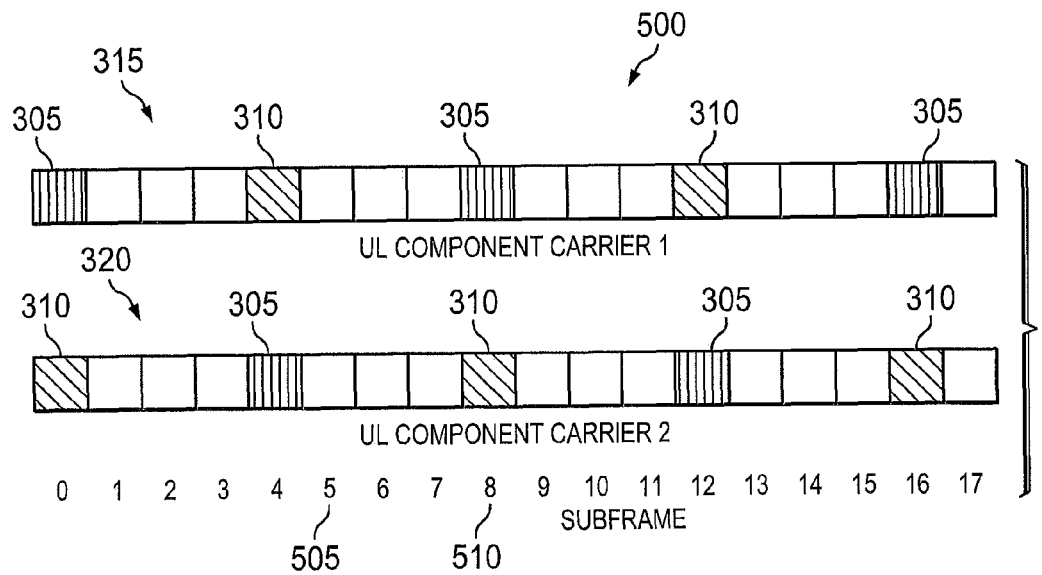
FIG. 5 illustrates hopped CQI Reporting according to embodiments of the present disclosure.

FIG. 5 illustrates Hopped CQI Reporting according to embodiments of the present disclosure. The embodiment of the Hopped CQI reporting 500 shown in FIG. 5 is for illustration only. Other embodiments could be used without departing from the scope of this disclosure.

In some embodiments, SS 116 performs PUCCH CQI reporting using different UL CCCs. Unlike where each UL CCC 315, 320 reports PUCCH CQI for its associated DL CCC as described herein above with respect to FIG. 3, the PUCCH CQI's 305, 310 hop on different UL CCCs 315, 320. That is, the first PUCCH CQI 305 report for DL CCC1 can be transmitted on UL CCC1 305 first, then hops to UL CCC2 320, and then hops back to UL CCC1 305 again. For example, initially, the first PUCCH CQI 305 is transmitted in UL CCC1 315 and the second PUCCH CQI 310 is transmitted in the UL CCC2 320. Thereafter, such as in the fifth subframe 505, the second PUCCH CQI 310 is transmitted in UL CCC1 315 and the first PUCCH CQI 305 is transmitted in UL CCC2 320. Further, such as in the ninth subframe 510, the first PUCCH CQI 305 is transmitted in UL CCC1 315 and the second PUCCH CQI 310 is transmitted in UL CCC2 320. Accordingly, SS 116 hops PUCCH CQI's 305, 315 among the UL CCCs 315, 320 to provide maximum diversity for the PUCCH CQI's 305, 310. SS 116 further mitigates the possibility of continued loss of PUCCH CQI 305, 310 on a given CCC 315, 320 due to reasons, such as power control error, strong interference, and the like, that may exist on one of the UL CCC's 315, 320.

Figure 6:
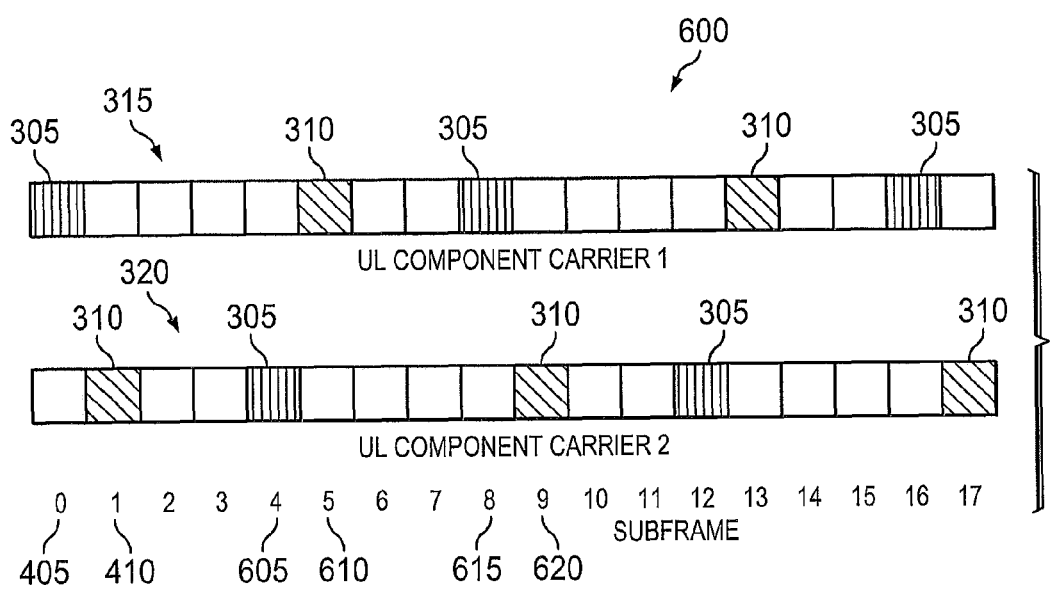
FIG. 6 illustrates Mixed CQI Reporting according to embodiments of the present disclosure.

FIG. 6 illustrates Mixed CQI Reporting according to embodiments of the present disclosure. The embodiment of the Mixed CQI reporting 600 shown in FIG. 6 is for illustration only. Other embodiments could be used without departing from the scope of this disclosure.

In some embodiments, SS 116 performs Hopped PUCCH CQI reporting using a timing offset to stagger the PUCCH CQI's 305, 310. As described herein above with respect to FIG. 5, each UL CCC 315, 320 hops between UL CCCs 315, 320. However, SS 116 inserts a timing offset between the CQI report in UL CCC1 315 and UL CCC2 320. The timing offset can be configured such that the PUCCH CQI in UL CCC2 320: lags the PUCCH CQI in UL CCC1 315; leads the PUCCH CQI in UL CCC1 315; or a combination of leading and lagging (as illustrated in FIG. 6) the PUCCH CQI in UL CCC1 315. For example, the first PUCCH CQI 305 is transmitted in a first subframe 405 of UL CCC1 315. Additionally, the second PUCCH CQI 310 is transmitted in a second subframe 410 of UL CCC2 320. Thereafter, the first PUCCH CQI 305 is transmitted in a fifth subframe 605 of UL CCC2 320 and the second PUCCH CQI 310 is transmitted in a sixth subframe 610 of UL CCC1 315. Further, the first PUCCH CQI 305 is transmitted in a ninth subframe 615 of UL CCC1 315 and the second PUCCH CQI 310 is transmitted in a tenth subframe 620 of UL CCC2 320, and so forth.

Accordingly, SS 116 staggers PUCCH CQI's 305, 315 to avoid transmitting in both UL CCCs 315, 320 at the same time. Using the Mixed (Hopped and Staggered) CQI Reporting 600, SS 116 can achieve maximum diversity for the PUCCH CQI report while maintaining the single carrier property of the UL transmission.

FIG. 7 illustrates Asymmetric Carrier Aggregation (CA) CQI Reporting according to embodiments of the present disclosure. The embodiment of the CA CQI reporting 700 shown in FIG. 7 is for illustration only. Other embodiments could be used without departing from the scope of this disclosure.

In some embodiments, a number of uplink component carriers (UL CCCs) used for PUCCH CQI reporting is less than the number of downlink component carriers (DL CCCs) that require a report. SS 116, therefore, can combine and transmit multiple PUCCH CQI's using fewer UL CCCs than DL CCCs. For example, SS 116 can combine PUCCH CQI 305 for DL CCC1 and PUCCH CQI 310 into a PUCCH CQI report 705 for DL CCC2 for transmission in the same subframes, referred herein as a CQI reporting subframe 710. The CQI reporting subframe 705 includes a first slot 715 and a second slot 720. SS 116 can multiplex PUCCH CQI's 305, 310 using a different cyclic shift and/or resource block number within the CQI reporting subframe 705. Therefore, the PUCCH CQI 705, transmitted over UL CCC1 315, can carry two different resources, such as both PUCCH CQI's 305, 310, in the same time slot.

FIG. 8 illustrates Asymmetric Carrier Aggregation (CA) offset CQI Reporting according to embodiments of the present disclosure. The embodiment of the CA offset CQI reporting 800 shown in FIG. 8 is for illustration only. Other embodiments could be used without departing from the scope of this disclosure.

In some embodiments, SS 116 performs Asymmetric CA PUCCH CQI reporting using a timing offset to stagger the PUCCH CQI's 305, 310. As described herein above with respect to FIG. 7, when the number of uplink component carriers is less than the number of downlink component carriers, SS 116 can combine and transmit multiple PUCCH CQI's using fewer UL CCCs than DL CCCs (such as in the example when SS 116 transmits PUCCH CQI's 305, 310 using a UL CCC1 310). SS 116, however, also can insert a timing offset between the PUCCH CQI's 305, 310 in UL CCC1 315. For example, the first PUCCH CQI 305 is transmitted in a first subframe 405. Additionally, the second PUCCH CQI 310 is transmitted in a second subframe 410. Accordingly, SS 116 staggers PUCCH CQI's 305, 315 to avoid transmitting in both PUCCH CQI's 305, 310 at the same time. Using the Staggered (timing offset) CQI Reporting 800, SS 116 saves battery power since a lower Peak-To-Average Ration (PAPR) is achieved at SS 116. Therefore, SS 116 is able to improve coverage in the uplink.

Figure 9:
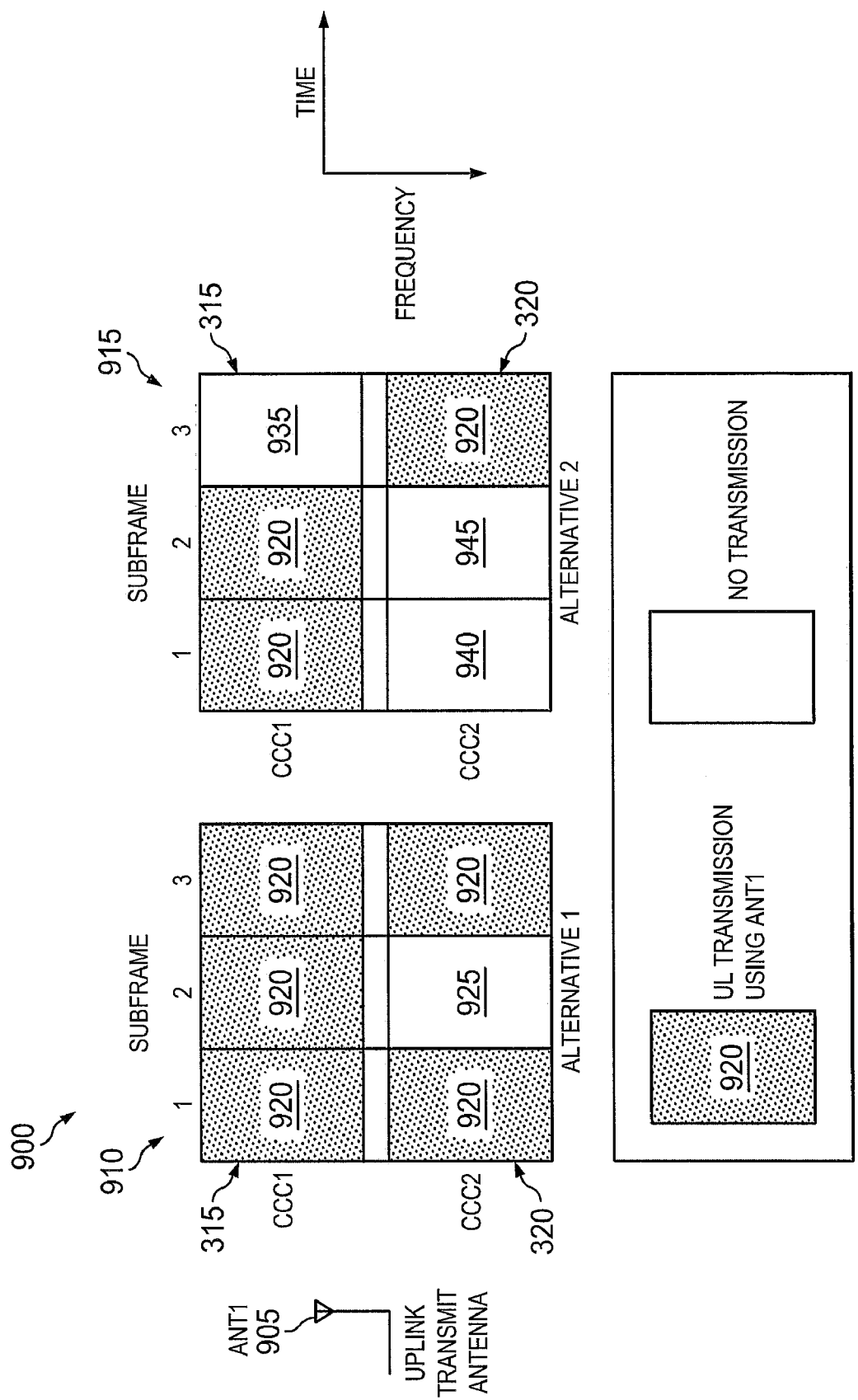
FIGS. 9 and 10 illustrate Asymmetric CA PUCCH CQI Reporting using one or more antennas according to embodiments of the present disclosure.
Figure 10:
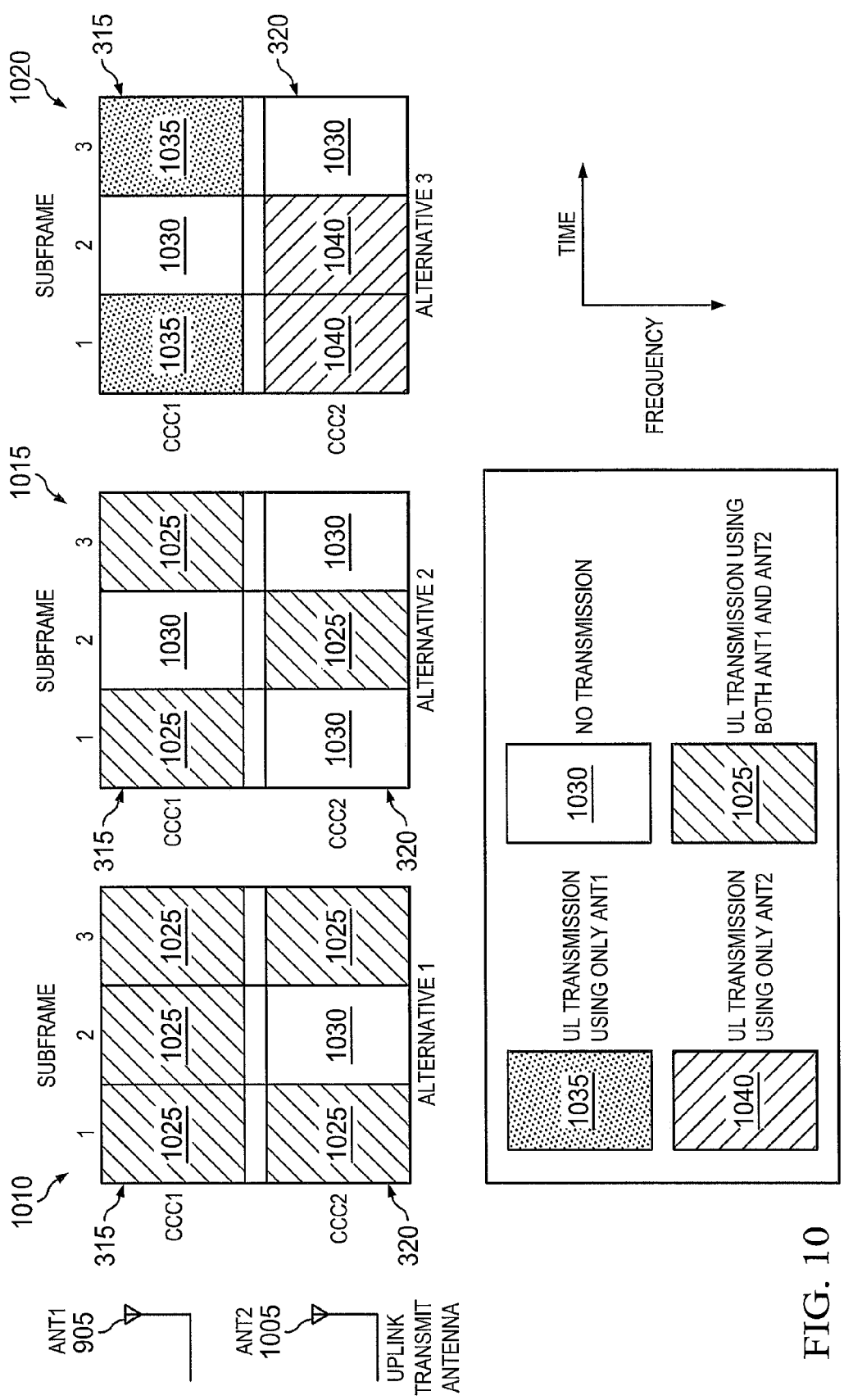

FIGS. 9 and 10 illustrate Asymmetric CA PUCCH CQI Reporting using one or more antennas according to embodiments of the present disclosure. The embodiments shown in FIGS. 9 and 10 are for illustration only. Other embodiments could be used without departing from the scope of this disclosure.

In some embodiments, illustrated in FIG. 9, SS 116 uses only one antenna, ANT1 905, for transmission in the uplink. The transmission on each UL CCC 315, 320 can be either PUCCH control or PUSCH data. SS 116 can use one of two alternative transmission modes 910, 915 in Carrier Aggregation. The selection of these two alternative transmission modes 910, 915 can be signaled semi-statically by higher layer signaling in either a UE-Specific manner with Radio Resource Control (RRC) signaling or in a cell-specific manner via a broadcast channel.

In a first alternative mode 910, SS 116 uses ANT1 905 for transmitting in any number of UL CCC's 315, 320 at a time, up to the maximum number of CCCs configured for SS 116 at the time. For example, SS 116 performs an uplink transmission 920 in all the subframes in UL CCC1 315 and some of the subframes in UL CCC2 320. SS 116 may not transmit in at least one subframe 925 in UL CCC2 320. The first alternative mode 910 is suitable when the CCC's 315, 320 are on contiguous frequency bands, or when SS 116 includes a power amplifier (PA) corresponding to each CCC (even in the when the CCC's 315, 320 are on non-contiguous frequency bands).

In a second alternative mode 915, SS 116 uses ANT1 905 for transmitting on one CCC within a given subframe. For example, SS 116 performs an uplink transmission 920 in the first two subframes in UL CCC1 315 and in the third subframe in UL CCC2 320. SS 116 does not transmit in the third subframe 935 in UL CCC1 315 or in the first and second subframes 940, 945 in UL CCC2 320. The second alternative mode 915 is suitable when SS 116 includes only one PA available for transmission, and especially when the CCC's 315, 320 are on non-contiguous frequency bands).

In some embodiments, illustrated in FIG. 10, SS 116 uses more than one antenna, such as ANT1 905 and ANT2 1005, for transmission in the uplink. The transmission on each UL CCC 315, 320 can be either PUCCH control or PUSCH data. SS 116 can use one of three alternative transmission modes 1010, 1015, 1020 in Carrier Aggregation. The selection of these three alternative transmission modes 1010, 1015, 1020 can be signaled semi-statically by higher layer signaling in either a UE-Specific manner with Radio Resource Control (RRC) signaling or in a cell-specific manner via a broadcast channel. Alternatively, SS 116 can be semi-statically switched between a first alternative mode 1010 and the second and third alternative modes 1015, 1020 using higher-layer signaling, while allowing dynamical switching between transmission modes a second and third alternative mode 1015, 1020.

In the first alternative mode 1010, SS 116 uses ANT1 905 and ANT2 1005 for transmitting in any number of UL CCC's 315, 320 at a time, up to the maximum number of CCCs configured for SS 116 at the time. For example, SS 116 performs an uplink transmission 1025 in all the subframes in UL CCC1 315 and some of the subframes in UL CCC2 320. SS 116 may not transmit 1030 in at least one subframe in UL CCC2 320. The transmission scheme in each CCC 315, 320 can be either transmit diversity, beamforming or spatial multiplexing. The first alternative mode 1010 is suitable when the CCC's 315, 320 are on contiguous frequency bands, or when SS 116 includes a power amplifier (PA) corresponding to each CCC (even in the when the CCC's 315, 320 are on non-contiguous frequency bands).

In a second alternative mode 1015, SS 116 uses ANT1 905 and ANT2 1005 for transmitting on one CCC within a given subframe. For example, SS 116 performs an uplink transmission 1025 in the first subframe in UL CCC1 315, in the second subframe in UL CCC2 320, and in the third subframe in UL CCC1 315. SS 116 does not transmit 1030 in UL CCC1 315 in the second subframe and in UL CCC2 320 in the first and the third subframes. The transmission scheme in each CCC can be either transmit diversity, beamforming or spatial multiplexing. The second alternative mode 1015 is suitable when SS 116 includes only one PA available for transmission, and especially when the CCC's 315, 320 are on non-contiguous frequency bands).

In a third alternative mode 1020, SS 116 uses ANT1 905 and ANT2 1005 for transmitting on different antennas within a given subframe. Each CCC is associated with a subset of antennas and UL transmission in this UL CCC can only be carried out by this subset of antennas. Further, each antenna, ANT1 905 and ANT2 1005, is only associated with one CCC, that is, these subsets of antennas do not overlap. For example, SS 116 performs an uplink transmission 1035 in the first and third subframes in UL CCC1 315 using ANT1 905. Additionally, SS 116 performs an uplink transmission 1040 in the second subframe in UL CCC2 320 using ANT2 1005. SS 116 does not transmit 1030 in UL CCC1 315 in the second subframe and in UL CCC2 320 in the third subframe. The transmission scheme in each CCC can be either transmit diversity, beamforming or spatial multiplexing. The second alternative mode 1015 is suitable when SS 116 includes only one PA available for transmission, and especially when the CCC's 315, 320 are on non-contiguous frequency bands). Further, unlike the second alternative mode 1015 wherein for each antenna its PA may work on different CCCs (and different frequency band in non-contiguous case) in different subframes; in the third alternative mode 1020, the PA for each antenna is always transmitting in only one CCC.

In some embodiments, the component carriers are bundled together and the payload is enlarged for a single carrier. The channel quality indices are jointly encoded across multiple DL component carriers. The jointly encoded CQIs are transmitted over multiple UL PUCCH resources. The number of UL PUCCH resources is the same as that of DL component carriers. For example, the joint encoding of CQI across multiple DL component carriers can be realized through Equation 1:

$$\left( K \times 20, \sum_{i=1}^{K} A_i \right) \quad [\text{Eqn. 1}]$$

where K is the number of DL component carriers over which the CQIs are jointly encoded. For example, in the following code: (20, 10) the "20" represents the encoded bits and the "10" is the information payload. When K=2 then the code becomes (40, 10). Accordingly, the K PUCCH resources can be sent through one UL component carrier or multiple UL component carriers as illustrated in FIGS. 11A through 11C.

Figure 11A:
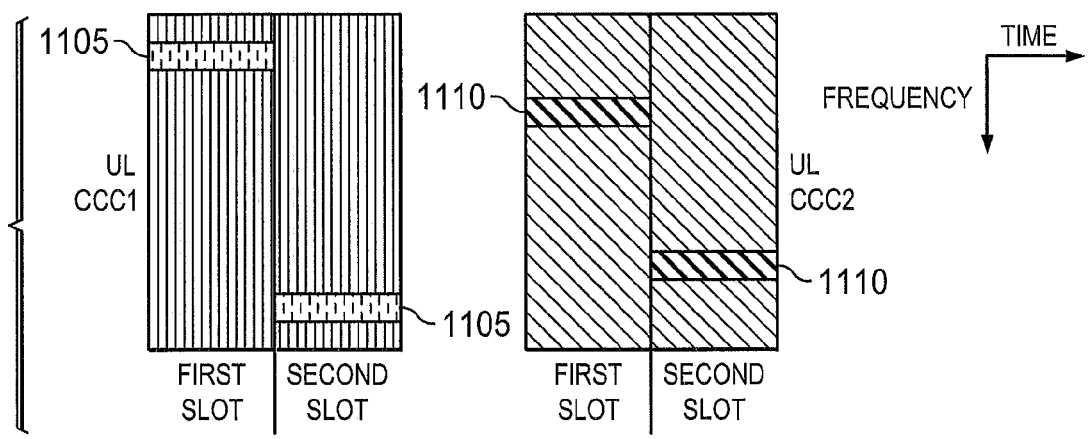
FIGS. 11A through 11C illustrate subframes for sending PUCCH Resources through UL CCCs according to embodiments of the present disclosure.
Figure 11B:
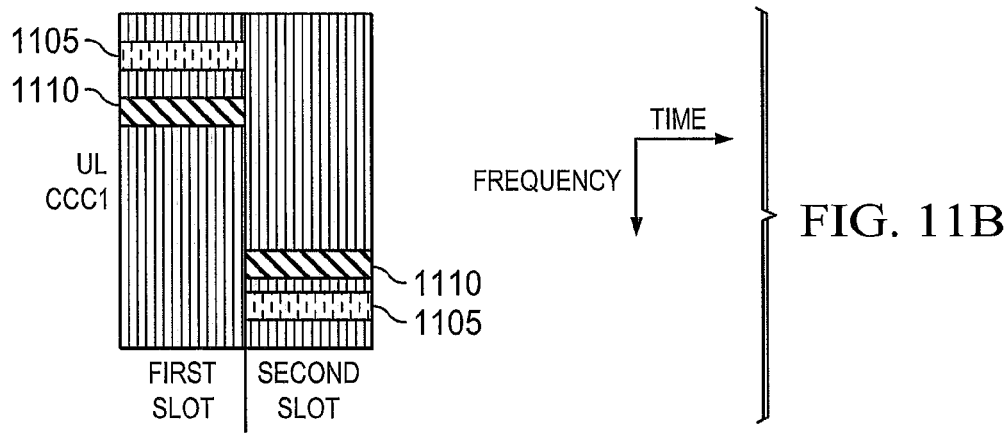
Figure 11C:
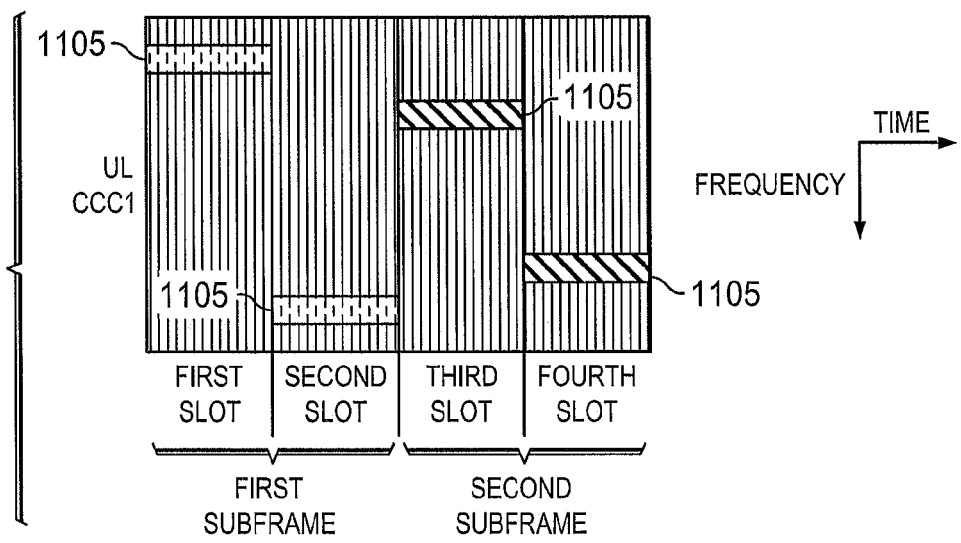

FIGS. 11A through 11C illustrate subframes for sending PUCCH Resources through UL CCCs according to embodiments of the present disclosure. The embodiments shown in FIGS. 11A through 11C are for illustration only. Other embodiments could be used without departing from the scope of this disclosure.

In the examples shown in FIGS. 11A through 11C, two DL component carriers (therefore, two PUCCH resources) are transmitted via three alternatives transmission modes.

In the example illustrated in FIG. 11A, SS 116 includes only one transmit antenna, such as ANT1 905 in FIG. 9, and transmits two PUCCH resources 1105, 1110 through two UL CCCs, such as UL CCC1 315 and UL CCC2 320. Further, similar approaches as described in FIG. 9 can be used. Similarly, when SS 116 includes multiple transmit antennas, such as ANT1 905 and ANT2 1005 in FIG. 10, and transmits two PUCCH resources 1105, 1110 through two UL CCCs 315, 320. Further, similar approaches as described in FIG. 10 can be used.

In the example illustrated in FIG. 11B, SS 116 includes multiple transmit antennas, such as ANT1 905 and ANT2 1005, and transmits two PUCCH resources 1105, 1110 through UL CCC1 315. The two PUCCH resources 1105, 1110 can be sent through different antennas, ANT1 905 and ANT2 1005. For example, PUCCH Resource1 1105 can be transmitted on ANT1 905 and PUCCH Resource2 1110 can be transmitted on ANT2 1005. Furthermore, PUCCH resources 1105, 1110 can hop on different transmit antennas. For example, the PUCCH resource1 1105 will be transmitted on UL ANT1 905 first, then hop to UL ANT2 1005, then back to UL ANT1 905 again.

In the example illustrated in FIG. 11C, SS 116 applies a timing offset as described hereinabove. SS 116 transmits two PUCCH resources 1105, 1110 over UL CCC1 315 through two subframes. Similar approaches as described with respect to FIG. 8.

Figure 12A:
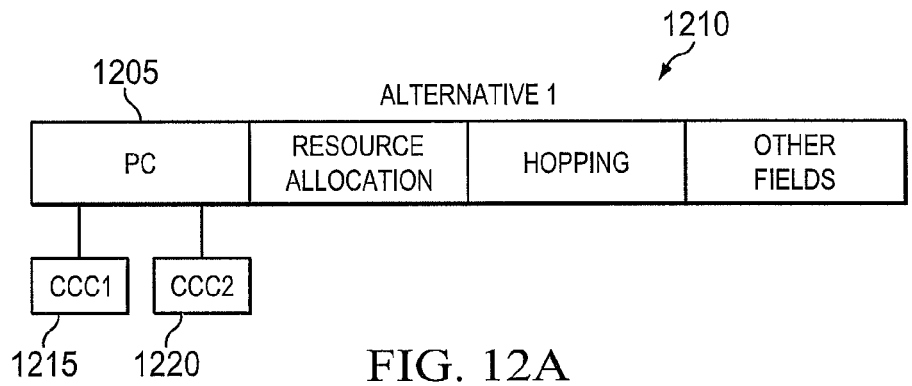
FIGS. 12A and 12B illustrate UE-Specific power control fields according to embodiments of the present disclosure.
Figure 12B:
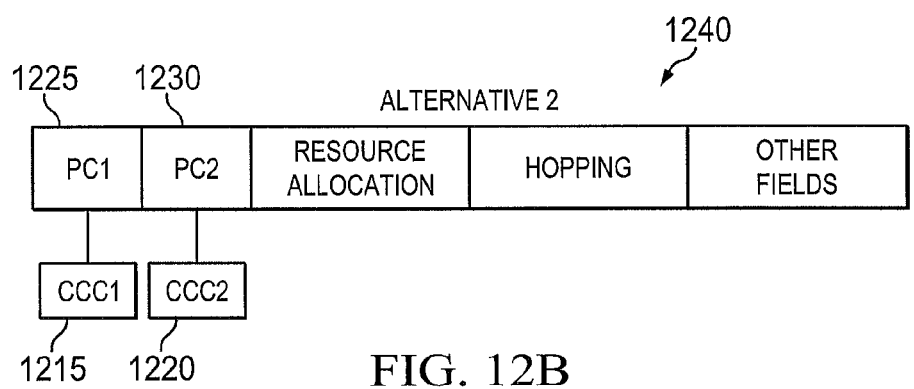

FIGS. 12A and 12B illustrate UE-Specific power control fields according to embodiments of the present disclosure. The embodiments shown in FIGS. 12A and 12B are for illustration only and other embodiments could be used without departing from the scope of this disclosure.

Power Control (PC) bits can be provided in the UL SA grant (DCI format 0 in LTE) in one of two different ways. Each PC filed could be two bits wide as in LTE Rel-8, 3GPP TS 36.212 v. 8.5.0, "E-UTRA, Multiplexing and Channel Coding, December 2008, or have other bit-widths. The contents of 3GPP TS 36.212 v. 8.5.0, "E-UTRA, Multiplexing and Channel Coding, December 2008 are incorporated by reference in its entirety.

In the first alternative illustrated in FIG. 12A, only one power control (PC) field 1205 exists in the UL SA 1210. This PC field 1205 is applied to all CCCs, such as CCC1 1215 and CCC2 1220, in the UL. The first alternative is suitable for the case where CCCs 1215, 1220 are on contiguous frequency bands and the interference patterns in these CCCs are not vastly different.

In the second alternative illustrated in FIG. 12B, multiple PC fields 1225, 1230 exists in the UL SA 1240. There is a first PC field 1225 for CCC1 1215 and a second PC field 1230 for CCC2 1220 in the UL transmission. The second alternative is suitable for the case where CCCs are on non-contiguous frequency bands, or on contiguous frequency bands but with large variation in interference pattern. It is clear that the overall size of the UL SA will grow with number of UL CCCs.

Figure 13:
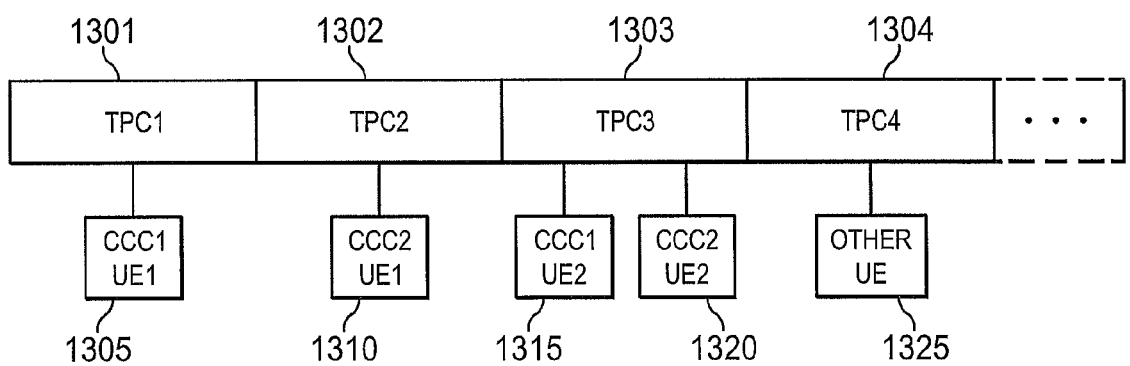
FIG. 13 illustrates a Carrier Specific common command according to embodiments of the present disclosure.

FIG. 13 illustrates a Carrier Specific common command according to embodiments of the present disclosure. The embodiment shown in FIG. 13 is for illustration only. Other embodiments could be used without departing from the scope of this disclosure.

In some embodiments, each subscriber station is associated with one common command for a group carrier (that is, carrier specific). A DCI format 3/3A contains the following fields in addition to the CRC bits: transmit power control (TPC) command number 1, TPC command number 2, . . . , TPC command number N.

In Rel-8 LTE, each TPC command is associated with a given subscriber station (that is with a give UE), and the association is defined in higher layer by the parameter "tpc-Index". Further, format 3 provides two bits for each TPC command while format 3A provides one bit for each TPC command.

In LTE-Advanced systems with carrier aggregation, the same fields remain in the DCI formats 3/3A, but with the following changes.

Each TPC command can be assigned to either one CCC for a given subscriber station, or all CCCs for a given subscriber station.

Within the same DCI format 3/3A, some TPC commands can be assigned to only one CCC in a subscriber station with multiple CCCs, while other TPC commands can be assigned to all CCCs for another subscriber station with multiple UL CCCs.

The index to the TPC command is provided by the higher layers for each subscriber station and each CCC.

An example is shown in FIG. 13 to illustrate how the TPC commands 1301, 1302, 1303, 1304 in DCI formats 3/3A are assigned to different subscriber stations. In the example illustrates in FIG. 13, at least two subscriber stations, such as SS 115 and SS 116, each include two CCCs. The first and second TPCs, TPC1 1301 and TPC2 1302 are assigned to SS 115 such that TPC1 1301 is assigned to CCC1 1305 of SS 115 and TPC2 1302 is assigned to CCC2 1310 of SS 115. Additionally, one TPC, TPC3 1303, is assigned to SS 116 such that TPC3 1303 is assigned to CCC1 1315 and CCC2 1320 of SS 116. The fourth TPC, TPC4 1304, can be assigned to a CCC 1325 another subscriber station, such as SS 114.

Figure 14:
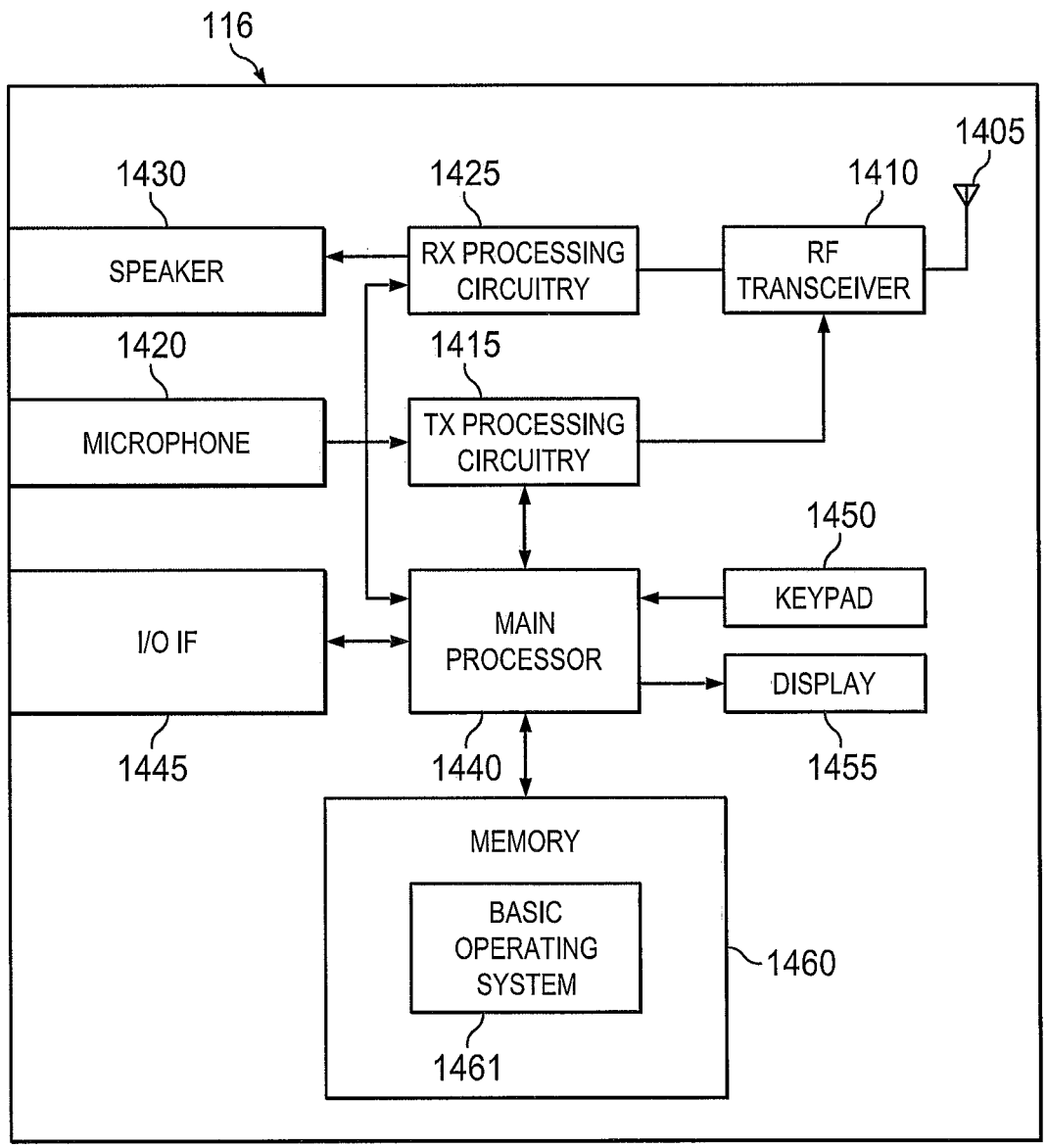
FIG. 14 illustrates an exemplary wireless mobile station according to embodiments of the present disclosure.

FIG. 14 illustrates an exemplary wireless mobile station according to embodiments of the present disclosure. The alternate embodiment of wireless subscriber station 116 illustrated in FIG. 14 is for illustration only. Other embodiments could be used without departing from the scope of this disclosure.

Wireless subscriber station 116 comprises antenna 1405, radio frequency (RF) transceiver 1410, transmit (TX) processing circuitry 1415, microphone 1420, and receive (RX) processing circuitry 1425. SS 116 also comprises speaker 1430, main processor 1440, input/output (I/O) interface (IF) 1445, keypad 1450, display 1455, and memory 1460. Memory 1460 further comprises basic operating system (OS) program 1461.

Radio frequency (RF) transceiver 1410 receives from antenna 1405 an incoming RF signal transmitted by a base station of wireless network 100. Antenna 1405 can comprise a number (Nt) of antenna 1405 (e.g., SS 116 includes Nt antenna 1405). Radio frequency (RF) transceiver 1410 down-converts the incoming RF signal to produce an intermediate frequency (IF) or a baseband signal. The IF or baseband signal is sent to receiver (RX) processing circuitry 1425 that produces a processed baseband signal by filtering, decoding, and/or digitizing the baseband or IF signal. Receiver (RX) processing circuitry 1425 transmits the processed baseband signal to speaker 1430 (that is, voice data) or to main processor 1440 for further processing (such as web browsing).

Transmitter (TX) processing circuitry 1415 receives analog or digital voice data from microphone 1420 or other outgoing baseband data (such as web data, e-mail, interactive video game data) from main processor 1440. Transmitter (TX) processing circuitry 1415 encodes, multiplexes, and/or digitizes the outgoing baseband data to produce a processed baseband or IF signal. Radio frequency (RF) transceiver 1410 receives the outgoing processed baseband or IF signal from transmitter (TX) processing circuitry 1415. Radio frequency (RF) transceiver 1410 up-converts the baseband or IF signal to a radio frequency (RF) signal that is transmitted via antenna 1405.

In some embodiments of the present disclosure, main processor 1440 is a microprocessor or microcontroller. Memory 1460 is coupled to main processor 1440. According to some embodiments of the present disclosure, part of memory 1460 comprises a random access memory (RAM) and another part of memory 1460 comprises a Flash memory, which acts as a read-only memory (ROM).

Main processor 1440 executes basic operating system (OS) program 1461 stored in memory 1460 in order to control the overall operation of wireless subscriber station 116 such as one or more of the functions disclosed herein including CQI reporting with carrier aggregation. In one such operation, main processor 1440 controls the reception of forward channel signals and the transmission of reverse channel signals by radio frequency (RF) transceiver 1410, receiver (RX) processing circuitry 1425, and transmitter (TX) processing circuitry 1415, in accordance with well-known principles.

Main processor 1440 is capable of executing other processes and programs resident in memory 1460. Main processor 1440 can move data into or out of memory 1460, as required by an executing process. Main processor 1440 is also coupled to I/O interface 1445. I/O interface 1445 provides subscriber station 116 with the ability to connect to other devices such as laptop computers and handheld computers. I/O interface 1445 is the communication path between these accessories and main controller 1440.

Main processor 1440 is also coupled to keypad 1450 and display unit 1455. The operator of subscriber station 116 uses keypad 1450 to enter data into subscriber station 116. Display 1455 may be a liquid crystal display capable of rendering text and/or at least limited graphics from web sites. Alternate embodiments may use other types of displays.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless communication network, a mobile station configured to communicate via an uplink transmission to at least one base station in a Multiple Input Multiple Output wireless network, the mobile station comprising:
   at least one transmit antenna; and
   a transmitter configured to communicate with the at least one base station via a plurality of downlink component carriers and at least one uplink component carrier, wherein the transmitter is configured to transmit at least one periodic Physical Uplink Control Channel (PUCCH) channel quality index (CQI) report for a downlink component carrier in the at least one uplink component carrier, and wherein the periods for the at least one PUCCH CQI report are the same for all uplink component carriers, and wherein a first PUCCH CQI for a first downlink component carrier is carried over a first uplink component carrier.

2. The mobile station as set forth in claim 1, wherein a number of uplink component carriers equals a number of downlink component carriers and wherein the transmitter is configured to transmit the CQI report such that each uplink component carrier carries a CQI corresponding to a respective downlink component carrier.

3. The mobile station as set forth in claim 2, wherein the CQI reporting mode comprises an offset mode such that the transmitter is configured to insert a timing offset into at least one CQI report such that a first CQI is transmitted in a different subframe than a second CQI.

4. The mobile station as set forth in claim 3, wherein when a minimum period among all PUCCH CQI reports is P, a period of the at least one PUCCH CQI report is N×P, where N is a positive integer, and wherein the timing offset varies from 0 to P−1.

5. The mobile station as set forth in claim 1, wherein the CQI reporting mode comprises a hopping mode such that the transmitter is configured to transmit the first PUCCH CQI report for the first downlink component carrier over the first uplink component carrier in a first subframe and over a second uplink component carrier in a subsequent subframe.

6. The mobile station as set forth in claim 5, wherein the transmitter is configured to insert a timing offset into at least one CQI report such that the first PUCCH CQI is transmitted in a different subframe than a second PUCCH CQI report for a second downlink component carrier.

7. For use in a wireless communication network, a mobile station configured to communicate via an uplink transmission to at least one base station in a Multiple Input Multiple Output wireless network, the mobile station comprising:
   at least one transmit antenna; and
   a transmitter configured to communicate with the at least one base station via a plurality of downlink component carriers and at least one uplink component carrier, wherein the transmitter is configured to transmit a channel quality index (CQI) report for a corresponding downlink component carrier in the at least one uplink component carrier, wherein a number of uplink component carriers is less than a number of downlink component carriers and wherein the transmitter is configured to transmit the CQI report corresponding to a subset of the downlink component carriers by transmitting at least two CQI reports corresponding to the set of downlink component carriers over one uplink component carrier.

8. The mobile station as set forth in claim 7, wherein the transmitter is configured to multiplex the at least two CQI reports on a different set of resources and transmit the multiplexed CQI reports in a subframe of at least one uplink component carrier.

9. The mobile station as set forth in claim 7, wherein the transmitter is configured to transmit a first of at least two CQI reports in a first subframe and a second of the at least two CQI reports in a second subframe.

10. The mobile station as set forth in claim 7, wherein the transmitter is configured, via one of a mobile station-specific higher layer signaling and a cell-specific broadcast signal, to select a CQI reporting mode of one of:
  sending a first of at least two CQI reports in a first subframe and a second of the at least two CQI reports in a second subframe; and
  multiplexing the at least two CQI reports on a different set of resources and transmitting the multiplexed CQI reports in a subframe of at least one uplink carrier.

11. The mobile station as set forth in claim 10, wherein the CQI reporting mode further comprises at least one of:
  a user equipment specific message in an uplink scheduling assignment grant wherein each transmit power control (TPC) corresponds to one component carrier for the mobile station; and
  a component carrier specific message in a common command wherein at least one TPC corresponds to all component carriers.

12. The mobile station as set forth in claim 7, wherein a plurality of the CQI reports across multiple component carriers are jointly encoded and transmitted over an enlarged payload, and wherein the enlarged payload comprises a plurality of uplink Physical Uplink Control Channel (PUCCH) resources.

13. The mobile station as set forth in claim 12, wherein at least two PUCCH CQI reports are sent over one uplink component carrier using at least one of a different cyclic shift and resource block number.

14. The mobile station as set forth in claim 12, wherein multiple antenna are utilized to transit the jointly encoded CQI reports and wherein each of the multiple antenna corresponds to a signal transmitted on a separate PUCCH resource.

15. For use in a wireless communication network, a mobile station configured to communicate via an uplink transmission to at least one base station in a Multiple Input Multiple Output wireless network, the mobile station comprising:
  at least one transmit antenna; and
  a transmitter configured to communicate with the at least one base station via a plurality of downlink component carriers and at least one uplink component carrier, wherein the transmitter is configured transmit data and a channel quality index (CQI) report for a corresponding downlink component carrier in the at least one uplink component carrier and the transmission is:
  via a plurality of uplink component carriers when the transmitter includes a plurality of power amplifiers; and
  via a first uplink component carrier in a first subframe and a second uplink component carrier in a second subframe when the transmitter includes one power amplifier.

16. The mobile station as set forth in claim 15, wherein the mobile station includes at least two transmit antenna, and wherein the transmitter is configured to transmit a first component carrier over a first antenna and a second component carrier over a second antenna.

17. The mobile station as set forth in claim 15, wherein the transmitter is configured to transmit a subset of component carriers over each antenna.

18. For use in a wireless communication network, a mobile station configured to communicate via an uplink transmission to at least one base station in a Multiple Input Multiple Output wireless network, the mobile station comprising:
  at least one transmit antenna;
  a transmitter configured to communicate with the at least one base station via a plurality of uplink component carriers and at least one downlink component carrier, wherein the transmitter is configured to transmit data and a channel quality index (CQI) report for a corresponding downlink component carrier in the at least one uplink component carrier; and
  a receiver configured to receive a transmit power control (TPC) command message jointly encoding a plurality of TPC fields, wherein each of the plurality of TPC fields is configured by a higher layer signaling to associate with at least one of the plurality of uplink component carriers.

19. The mobile station as set forth in claim 18, wherein the association is an uplink component carrier specific association, wherein each of a multiple of the plurality of TPC fields associates with one of the plurality of uplink component carriers.

20. The mobile station as set forth in claim 18, wherein the association is an uplink component carrier common association, wherein one of the plurality of TPC fields associates with all of the plurality of uplink component carriers.

21. The mobile station as set forth in claim 18, wherein the TPC command message is one of a DCI Format 3 and DCI Format 3A in accordance to a $3^{rd}$ Generation Partnership Project (3GPP) Technical Specification 36.212.

22. For use in a wireless communication network, a method for communicating via an uplink transmission to at least one base station in a Multiple Input Multiple Output wireless network, the communication via a plurality of downlink component carriers and at least one uplink component carrier, the method comprising:
  transmitting at least one periodic Physical Uplink Control Channel (PUCCH) channel quality index (CQI) report for a downlink component carrier in the at least one uplink component carrier, wherein the periods for the at least one PUCCH CQI report are the same for all uplink component carriers, and wherein a first PUCCH CQI for a first downlink component carrier is carried over a first uplink component carrier.

23. The method as set forth in claim 22, wherein a number of uplink component carriers equals a number of downlink component carriers, and wherein transmitting comprises:
  transmitting the CQI report such that each uplink component carrier carries a CQI corresponding to a respective downlink component carrier.

24. The method as set forth in claim 23, wherein the CQI reporting mode comprises an offset mode, the method further comprising:
  inserting a timing offset into at least one CQI report such that a first CQI is transmitted in a different subframe than a second CQI.

25. The method as set forth in claim 24, wherein when a minimum period among all PUCCH CQI reports is P, a period of the at least one PUCCH CQI report is N×P, where N is a positive integer, and wherein the timing offset varies from 0 to P−1.

26. The method as set forth in claim 22, wherein the CQI reporting mode comprises a hopping mode, and wherein transmitting comprises:
  transmitting the first PUCCH CQI report for the first downlink component carrier over the first uplink component carrier in a first subframe and over a second uplink component carrier in a subsequent subframe.

27. The method as set forth in claim 26, further comprising:
  inserting a timing offset into at least one CQI report such that the first PUCCH CQI is transmitted in a different subframe than a second PUCCH CQI report for a second downlink component carrier.

28. For use in a wireless communication network, a method for communicating via an uplink transmission to at least one base station in a Multiple Input Multiple Output wireless network, the communication via a plurality of downlink component carriers and at least one uplink component carrier, the method comprising:
  transmitting a channel quality index (CQI) report for a corresponding downlink component carrier in the at least one uplink component carrier, wherein a number of uplink component carriers is less than a number of downlink component carriers and wherein transmitting the CQI report corresponding to a subset of the downlink component carriers comprises transmitting at least two CQI reports corresponding to the set of downlink component carriers over one uplink component carrier.

29. The method as set forth in claim 28, wherein transmitting further comprises:
  multiplexing the at least two CQI reports on a different set of resources; and
  transmitting the multiplexed CQI reports in a subframe of at least one uplink component carrier.

30. The method as set forth in claim 28, wherein transmitting further comprises:
  transmitting a first of at least two CQI reports in a first subframe and a second of the at least two CQI reports in a second subframe.

31. The method as set forth in claim 28, wherein transmitting further comprises selecting, via one of a mobile station-specific higher layer signaling and a cell-specific broadcast signal, a CQI reporting mode of one of:
  sending a first of at least two CQI reports in a first subframe and a second of the at least two CQI reports in a second subframe; and
  multiplexing the at least two CQI reports on a different set of resources and transmitting the multiplexed CQI reports in a subframe of at least one uplink carrier.

32. The method as set forth in claim 31, wherein the CQI reporting mode further comprises at least one of:
  a user equipment specific message in an uplink scheduling assignment grant wherein each transmit power control (TPC) corresponds to one component carrier for the mobile station; and
  a component carrier specific message in a common command wherein at least one TPC corresponds to all component carriers.

33. The method as set forth in claim 28, further comprising jointly encoding a plurality of the CQI reports across multiple component carriers; and
  transmitting the jointly encoded CQI reports over an enlarged payload, the enlarged payload comprising a plurality of uplink Physical Uplink Control Channel (PUCCH) resources.

34. The method as set forth in claim 33, further comprising sending at least two PUCCH CQI reports over one uplink component carrier using at least one of a different cyclic shift and resource block number.

35. The method as set forth in claim 33, further comprising utilizing multiple antenna to transit the jointly encoded CQI reports and wherein each of the multiple antenna corresponds to a signal transmitted on a separate PUCCH resource.

36. For use in a wireless communication network, a method for communicating via an uplink transmission to at least one base station in a Multiple Input Multiple Output wireless network, the communication via a plurality of downlink component carriers and at least one uplink component carrier, the method comprising:
  transmitting, by a transmitter, data and a channel quality index (CQI) report for a corresponding downlink component carrier in the at least one uplink component carrier and wherein transmitting comprises:
    transmitting via a plurality of uplink component carriers when the transmitter includes a plurality of power amplifiers; and
    transmitting via a first uplink component carrier in a first subframe and a second uplink component carrier in a second subframe when the transmitter includes one power amplifier.

37. The method as set forth in claim 36, wherein the mobile station includes at least two transmit antenna, and wherein transmitting comprises transmitting a first component carrier over a first antenna and a second component carrier over a second antenna.

38. The method as set forth in claim 36, wherein transmitting comprises transmitting a subset of component carriers over each antenna.

39. For use in a wireless communication network, a method for communicating via an uplink transmission to at least one base station in a Multiple Input Multiple Output wireless network, the communication via a plurality of downlink component carriers and at least one uplink component carrier, the method comprising:
  transmitting, by a transmitter, data and a channel quality index (CQI) report for a corresponding downlink component carrier in the at least one uplink component carrier; and
  receiving, by a receiver, a transmit power control (TPC) command message jointly encoding a plurality of TPC fields, wherein each of the plurality of TPC fields is configured by a higher layer signaling to associate with at least one of the plurality of uplink component carriers.

40. The method as set forth in claim 39, wherein the association is an uplink component carrier specific association, wherein each of a multiple of the plurality of TPC fields associates with one of the plurality of uplink component carriers.

41. The method as set forth in claim 39, wherein the association is an uplink component carrier common association, wherein one of the plurality of TPC fields associate with all of the plurality of uplink component carriers.

42. The method as set forth in claim 39, wherein the TPC command message is one of a DCI Format 3 and DCI Format 3A in accordance to a $3^{rd}$ Generation Partnership Project (3GPP) Technical Specification 36.212.

* * * * *